United States Patent
Van Otteren et al.

[11] Patent Number: 6,054,668
[45] Date of Patent: Apr. 25, 2000

[54] METHOD AND APPARATUS OF PROJECTION WELDING

[75] Inventors: Robert G. Van Otteren, Bay City; Samuel E. Lewis, Midland; Darin M. Gilbert, Essexville, all of Mich.

[73] Assignee: Newcor, Inc., Bloomfield Hills, Mich.

[21] Appl. No.: 08/895,526

[22] Filed: Jul. 17, 1997

[51] Int. Cl.⁷ .................................................. B23K 11/14
[52] U.S. Cl. ............................................. 219/93; 219/108
[58] Field of Search ............................. 219/86.1, 86.25, 219/86.9, 91.1, 91.2, 91.23, 93, 94, 108, 110, 111, 117.1, 118

[56] References Cited

U.S. PATENT DOCUMENTS

| | | |
|---|---|---|
| 2,255,652 | 9/1941 | Dawson et al. . |
| 2,415,708 | 2/1947 | Sciaky ..................................... 219/112 |
| 3,317,703 | 5/1967 | Gilbert ..................................... 219/111 |
| 3,398,255 | 8/1968 | Aldenhoff . |
| 3,445,620 | 5/1969 | Littwin et al. . |
| 3,504,157 | 3/1970 | Vanderhelst ............................. 219/110 |
| 3,541,429 | 11/1970 | Martin ................................. 219/108 X |
| 3,632,958 | 1/1972 | Width . |
| 3,899,653 | 8/1975 | Spinnato ................................. 219/113 |
| 4,282,417 | 8/1981 | Jurek . |
| 4,417,122 | 11/1983 | Thorne . |
| 4,591,687 | 5/1986 | Urech ........................................ 219/93 |
| 4,876,431 | 10/1989 | Livingston ............................. 219/110 |
| 5,140,126 | 8/1992 | Ishibashi ................................. 219/110 |
| 5,714,730 | 2/1998 | Geiermann et al. ................. 219/86.25 |

FOREIGN PATENT DOCUMENTS

| | | |
|---|---|---|
| 1 207 696 | 10/1970 | United Kingdom . |
| 2 068 814A | 8/1981 | United Kingdom . |

OTHER PUBLICATIONS

Materials Joining Tech Briefs, Brief #2, Body Materials Engineering, Sep. 1994, published by Materials Engineering's Materials Joining Laboratory (2 pages).

Materials Joining Tech Briefs, Brief #3, Body Materials Engineering, Oct. 1994, published by Materials Engineering's Materials Joining Laboratory (2 pages).

Materials Joining Tech Briefs, Brief #4, Body Materials Engineering, Nov. 1994, published by Materials Engineering's Materials Joining Laboratory (2 pages).

Brochure entitled "HY–PAK™ Solutions", Newcor, Bay City Division, Apr. 1991 (6 pages), and "Hy–Pak Welding" enclosure sheets (29 pages).

"Solutions Through Proprietary Welding Technology", Innovative Manufacturing Systems, Apr. 1991, (4 pages).

(List continued on next page.)

*Primary Examiner*—Gregory Mills
*Attorney, Agent, or Firm*—Flynn, Thiel, Boutell & Tanis, P.C.

[57] ABSTRACT

A process and apparatus for projection welding of overlapping nonferrous sheets, particularly thin aluminum sheets. One of the sheets is provided with a projection therein, and the sheets are positioned so that the tip of the projection contacts a surface of the other sheet. The sheets are not subjected to surface pretreatment to remove the surface oxides therefrom. A projection welding head assembly is positioned with the electrode thereof engaged with one of the sheets, and the other sheet is positioned against a stationary backup or electrode. The electrode of the welding head imposes, in rapid time succession, a series of welding pulses to the overlapping contacting sheets. The series of welding pulses includes two and preferably three pulses which progressively step up in amperage to provide for precise control of the heating of the projection and the associated contact area on the other sheet to cause heating to the plastic state, and then forging (i.e. collapsing) of the projection with subsequent and progressive creation of the desired weld nugget. The series of weld pulses also preferably includes, at the end of the series, one or two pulses which progressively step down in current magnitude to permit greater control over the plasticity of the projection and the forging together of the overlapping sheets to create the desired weld bead.

17 Claims, 6 Drawing Sheets

OTHER PUBLICATIONS

"Stamping the Ram", by Lindsay Brooke, Reprinted from Automotive Industries Sep. 1993 issue, Furnished by Bay City Division, Newcor, Inc. (2 pages).

Untersuchungen zur Erhoehung der Fertigungs—sicherheit beim Buckelschweissen unter Beruecksichtigung der Buckelgeometrie, Dipl.–Ing. Hans Polrotniczak, et al., Jan. 1, 1993, vol. 45, No. 1, pp. 20–26.

"Studies for increasing the manufacturing safety during the projection welding taking into consideration the projection geometry", 19 pages (1993).

METHOD AND APPARATUS OF PROJECTION WELDING

FIELD OF THE INVENTION

This invention relates to a method and apparatus for projection welding and, more particularly, to an improved method and apparatus for projection welding of overlapping nonferrous metal sheets such as aluminum sheets.

BACKGROUND OF THE INVENTION

Projection welding is a known technique for permitting a weld-type securement between two thin overlapping metal sheets, particularly ferrous (i.e. steel) sheets. In projection welding, which is desirable because it permits use of conventional low-frequency (i.e. 60 cycle) voltage and current, one of the steel sheets is provided with a small projection extending transversely therefrom, with the tip of the projection being maintained in contact with the other overlapping sheet. The electrode of a welding gun is pressed into contact with the other steel sheet, generally in alignment with the projection, and a combination of force and electric current is applied to the electrode to effect welding together of the two sheets at the contact area defined by the projection, and to collapse the projection to thereby effect a weld nugget for securing the overlapping steel sheets together.

In the known projection welding technique, during a single projection welding operation, it has been conventional to apply alternating electrical current to the contact electrode over a fairly long time period, whereby several cycles of AC current are applied to the electrode to permit performance of a single projection weld. This long current application time, and the difficulty in achieving the desired contact force and collapsing of the heated electrode, have often resulted in disadvantages which have made projection welding less than desired for use on thin gauge steel sheets. For example, difficulties have often been observed with respect to marking or discoloration of the sheet surface, or if the sheets are coated, then damage to the coating often results. For these and other reasons, projection welding has previously not met with a high level of acceptance for use on thin steel sheets, although more recently a greater acceptance is being achieved.

In this regard, U.S. Pat. No. 4,417,122 as owned by the Assignee hereof relates to a desired projection welding arrangement wherein a low-inertia fast-response welding gun is provided for effecting contact with and projection welding between two overlapping light-gauge steel sheets. With the arrangement of the aforesaid patent, not only is there provided a welding gun having a low-inertia and hence fast response electrode, but more significantly the electrical current is applied to the electrode for only an extremely short time duration, which duration is only a fraction of one-half of a typical alternating current wave cycle. In this manner, a very high energy pulse of current, of very short time duration, is transmitted to the moving welding head and applied to the projection contact area between the overlapping sheets to thereby effect rapid and efficient welding of the sheets together. This system has been able to provide a desirable weld nugget between the overlapping sheets without causing any significant heat-effected zone, and without causing excessive discoloration or marking of the sheets. Hence, the arrangement of the '122 patent has in recent years become more accepted for projection welding, particularly for hem-type projection welding such as is conventionally utilized for securing thin gauge steel sheets as associated with automobiles and the like.

Figure 1:
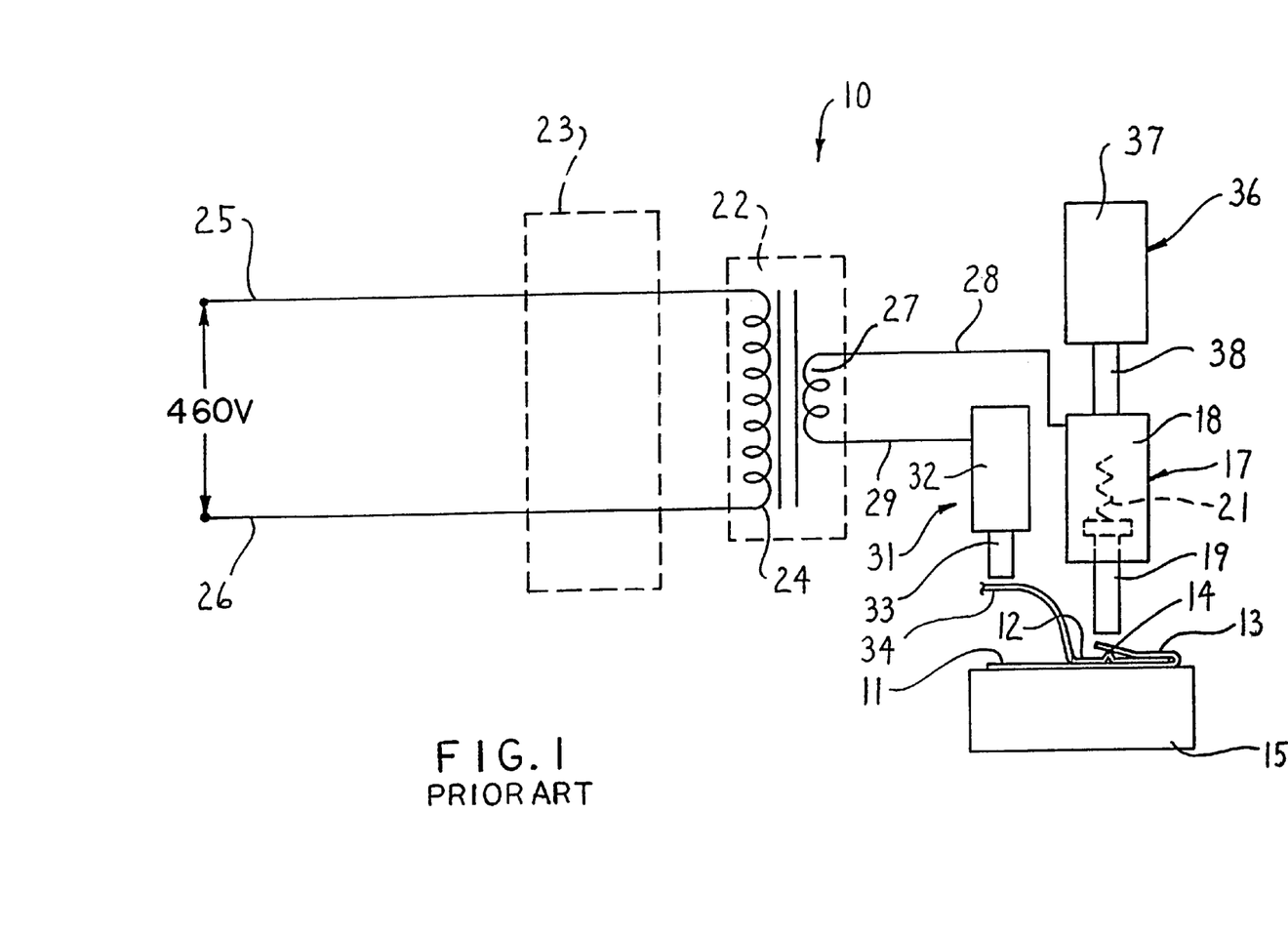
FIG. 1 diagrammatically illustrates a prior art projection welding arrangement, particularly a hem-type welding arrangement.
Figure 2:
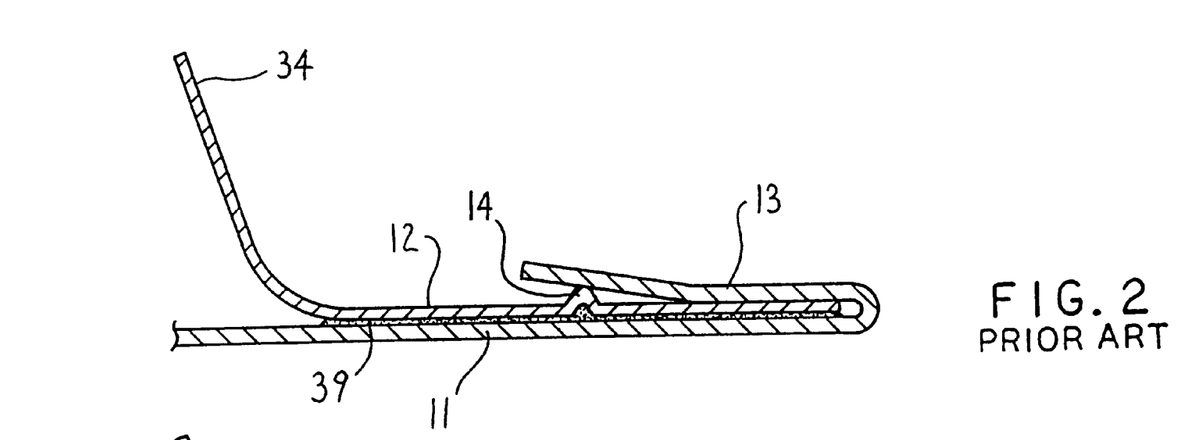
FIG. 2 illustrates, on an enlarged scale, a known hem-type projection welding arrangement for overlapping steel sheets, prior to creation of the projection weld.
Figure 3:
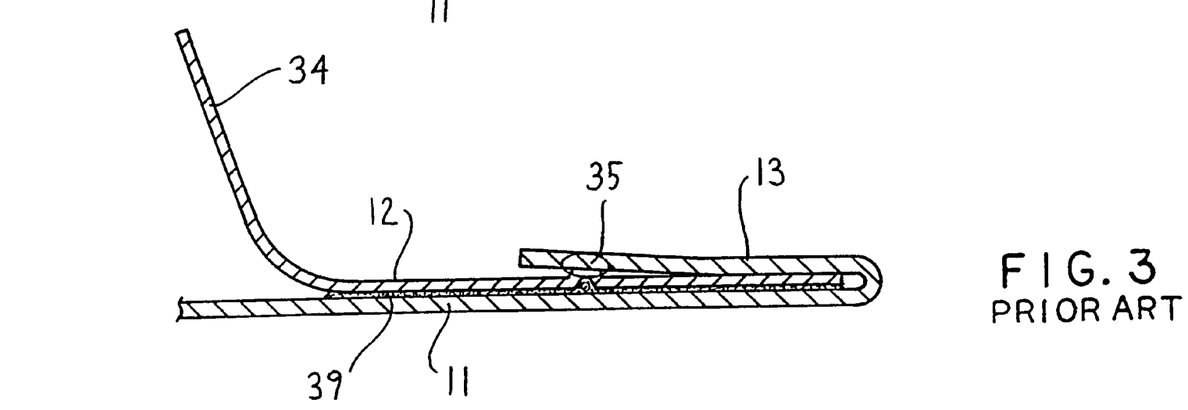
FIG. 3 is a view corresponding to FIG. 2 but illustrating the arrangement after creation of the projection weld.

Referring to FIGS. 1–3, there is illustrated a known arrangement for effecting projection hem welding, which arrangement incorporates therein the projection welding arrangement of the '122 patent. This welding arrangement 10 is particularly desirable for projection welding of thin sheetlike steel components disposed in overlapping relation, typically light gauge steel sheets which commonly have a thickness in the range of 0.020 to 0.050 inch. The thin steel workpieces or sheets to be welded are illustrated at 11 and 12, which steel sheets have portions which directly overlap as shown in FIG. 1, and in a hem welding process one of the steel sheets 11 also has a flange or hem part 13 which is bent upwardly to overlap the remote side of the other steel sheet 12, whereby the sheet 12 is sandwiched between the sheet 11 and its hem part 13. The intermediate sheet 12 also is provided with a bead or projection 14 formed therein and projecting transversely therefrom so that the tip of the projection contacts the inner (i.e. lower) surface of the hem part 13. In this hem type arrangement, a projection weld is created directly between the sheet 12 and the hem part 13 at the region of the projection 14.

In this known projection welding arrangement 10 the overlapping steel sheets (i.e., the workpieces) are typically positioned on a backup support or die 15, and a movable welding head assembly 17 is positioned adjacent the die 15 so as to cooperate with the overlapping sheets to permit creation of the projection weld. The movable welding head assembly 17 includes a hollow housing or body 18 having an electrode 19 movably supported therein and projecting outwardly for contact with the overlapping sheets in the region of the projection, and a spring 21 (typically a coil spring) is confined within the housing and acts against an inner face of the electrode 19 so as to urge the electrode 19 outwardly into an extended position, in which position the electrode abuts an interior stop surface formed on the housing. The movable welding head assembly 17 is electrically connected to a stationary transformer 22. The power supply to the transformer 22, and hence the welding current supplied thereto to the welding head assembly, is in turn controlled by a suitable control unit 23. The transformer 22 has the primary coils 24 thereof connected to suitable electrical leads or conductors 25 and 26, which conductors typically have a conventional 460 volt, single phase, 60 hertz power supply connected thereto. The secondary coils 27 of the transformer are in turn connected to suitable conductors 28 and 29, one of which is connected to the welding head assembly 17 and the other of which is connected on a downstream side of the sandwiched workpieces, such as by being connected either to the die 15 or in a hem welding process being connected to an electrical contact gun 31 as illustrated in FIG. 1. This contact gun 31 includes a support 32 such as a conventional double-piston double-acting pressure cylinder, normally an air cylinder, having a conventional electrode 33 movably supported thereon, the latter being positioned for engagement with a part 34 of the intermediate sheet 12, which part 34 where it engages the electrode 33 being spaced from the overlapping or sandwiched portions of the sheets and also being spaced from the sheet 11. The conductors 28 and 29 are typically constructed as conventional flexible laminations so as to permit movements of the welding head assembly 17 and contact head assembly 31 relative to the transformer 22.

The welding arrangement also includes a drive device 36 for effecting movement of the welding head assembly 17. This drive device typically constitutes a pneumatic cylinder having a housing 37 which is typically stationary mounted, and provided with an extendible and contractible piston rod 38 which in turn couples to the housing 18 of the welding head assembly 17 to control the movement of the assembly 17 into engagement with the sheets when a projection welding operation is to be carried out.

In a typical projection welding operation, the drive 36 is energized and moves the head assembly 17 downwardly to cause the electrode 19 to engage the sheet part 13 adjacent or substantially in alignment with the projection 14, with the downward movement being sufficient to cause an inward depression of the electrode 19 and hence a compression of the spring 21. The control unit 23 then supplies a very short duration, unipolar, high energy electrical current pulse to the electrode 19 which effects heating of the projection 14 and of the sheet part 13 in the immediate vicinity of the projection. This, coupled with the pressure imposed on the electrode by the spring 21, effects collapsing of the heated projection to thereby create a weld bead or nugget 35 between the sheet parts 12 and 13 substantially as illustrated in FIG. 3.

When carrying out a hem welding operation, typically for welding of an outer automotive body sheet 11 to an inner support sheet 12, the overlapping edge portions of the steel sheets 11 and 12 typically have an adhesive 39 provided therebetween, but this adhesive is not effective for fixedly securing the sheets 11 and 12 together until subjected to high temperatures such as experienced in a paint drying oven. Accordingly, the projection weld is provided so as to at least temporarily fixedly join the sheets 11 and 12 together to maintain dimensional stability during subsequent handling and operations, and when the finished automotive part is ultimately painted and placed in the heat drying oven, then the adhesive 39 is activated to create a fixed securement of the sheets 11 and 12 together.

Figure 4:
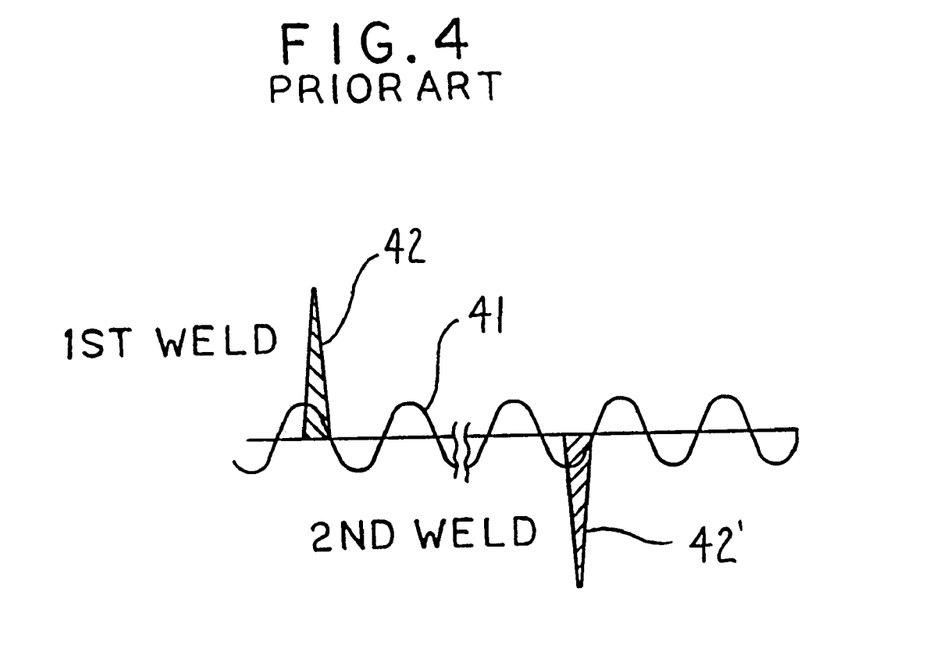
FIG. 4 illustrates a typical high energy welding pulse, in comparison to a conventional low energy multiple-cycle welding pulse, both being known.
Figure 5:
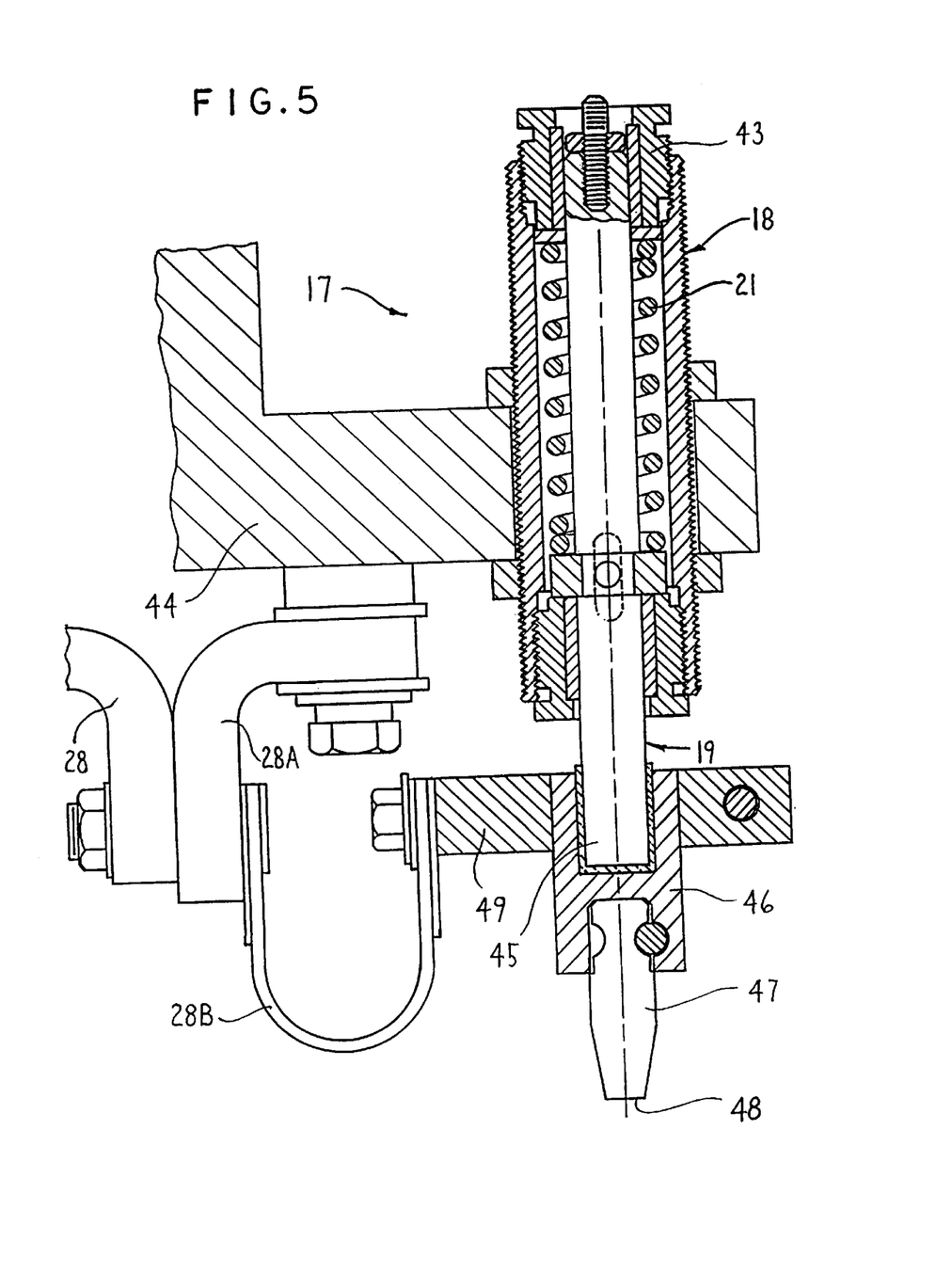
FIG. 5 is a longitudinal cross sectional view of the improved welding gun of aforementioned Ser. No. 08/734, 484, and illustrating the electrode in a condition wherein it is resiliently preloaded and positioned for contact with an overlapping sheet prior to initiation of a projection welding operation.

With respect to the creation of the projection weld, and referring to FIG. 4, in many of the known projection welding techniques the welding current applied to the electrode constitutes a low-frequency sinusoidal alternating-current wave form as shown at 41 in FIG. 4, and most typically several cycles of the current wave form are applied to the electrode to effect a single projection weld. In use of the welding head and projection welding arrangement disclosed in the '122 patent, and as depicted by FIG. 1, however, the electrode is subjected only to a very short duration, unipolar, high-intensity electrical current pulse 42 so as to effect a projection welding operation. Further, the control unit 23 preferably includes appropriate switching circuitry or switching software so that subsequent welding operations are of opposite polarity, for example the first weld being a unipolar pulse 42 as shown in FIG. 4, and the next or second weld being a similar pulse but of opposite polarity as indicated at 42'. The welding pulse which is used for each projection weld has a duration which occurs solely within a single half-cycle of the alternating-current wave form, and the duration of the current pulse such as pulse 42 is less than the time duration of the half wave form.

The specifics of the construction and operation of the welding arrangement 10 as summarized above is explained in the '122 patent, and further detailed description thereof is believed unnecessary.

While projection welding and particularly hem-type projection welding using a pulse-type welding head of the aforementioned type has proven fairly successful and is gaining in commercial acceptability for welding steel sheets, nevertheless it has been observed that such arrangement still has less than optimum characteristics. For example, with this type of welding head, the spring which biases the electrode is normally in either a non-compressed or minimally compressed condition when the electrode is fully extended and, consequently, due to the significant variation in the spring rate characteristics in springs of this type, it has been observed that each welding head when subjected to an inward electrode depression and spring compression of a predetermined amount nevertheless results in significantly varying spring force magnitudes, and this in turn adversely effects the repeatability and dependability of the projection welds being produced. Further, with this arrangement the electrode typically has to be depressed through a significant distance, often in the order of three-fourths inch, and accordingly causes a corresponding large cycling stroke or compression of the spring, which in turn decreases the life of the spring. This long stroke also has been observed to, in some instances, result in the electrode being extended outwardly by this spring so as to contact and damage the copper support plate when the metal sheets are not present thereon, and this in turn can require that the copper support plate be repaired or replaced. The variability of the compressed force of the spring when under a normal load or compression condition, prior to actual initiation of the heating and compressing operation so as to effect welding, also has been observed to adversely effect the quality of the weld nugget being formed since an optimum weld nugget is formed by controlling and coordinating the magnitude of the electrical current peak in conjunction with the compression force imposed on the electrode by the spring, all in turn determined in conjunction with the thickness of the metal sheets and the size of the projection, so as to result in optimization of the heating and compression and collapsing of the projection so as to create the desired weld nugget.

To improve on the projection welding arrangement as described above, the Assignee hereof developed an improved welding head which has demonstrated the ability to significantly improve on or at least partially overcome many of the inconveniences and irregularities discussed above. This improved welding head, as disclosed in Assignee's copending U.S.A. application Ser. No. 08/734,484 filed Oct. 21, 1996 (the disclosure of which in its entirety is incorporated herein by reference), has an electrode-biasing spring which is initially preloaded to always exert a significant biasing force on the electrode to maintain it against a stop and thus define a normal fully extended position of the electrode. The spring is initially precalibrated to exert an accurate predetermined biasing force on the electrode when the electrode is depressed inwardly and effects compression of the spring by a predetermined distance, which latter distance is normally of small magnitude to minimize spring wear and optimize the responsiveness of electrode movement. Thus, when the welding head is disposed in engagement with overlapping steel sheets in alignment with a projection, the electrode is depressed through said predetermined distance whereby a uniform predetermined biasing force is always applied to the electrode and hence to the projection weld area.

While the improved welding head of the aforesaid application has provided improved projection welding capability with respect to overlapping thin steel sheets, and has been achieving significant commercial acceptance, nevertheless the known projection welding process utilizing this improved welding head still is principally limited for use in projection welding of steel sheets.

Accordingly, while projection welding of ferrous or steel sheets has now reached a reasonable degree of development and commercial acceptance, nevertheless projection welding of thin nonferrous sheets such as aluminum is still generally considered not feasible, and in fact the welding of thin aluminum sheets continues to present difficulties or impose welding parameters which make welding thereof difficult and hence inefficient and expensive, and in many situations such is economically prohibited from a commercial standpoint.

When dealing with thin nonferrous sheets and specifically thin aluminum sheets, such as aluminum sheets in the range of from about 0.030 inch to about 0.050 inch, attempting to weld these aluminum sheets presents several technical problems due to the physical characteristics and properties of aluminum. A first problem with attempting to weld aluminum is the very low melting temperature thereof. The melting temperature of aluminum is normally in the range of about 1,100° F. to 1,250° F., this being in contrast to steel wherein the melting temperature is typically in the range of 2,400° F. to 2,700° F. A second and significant problem is that the plastic range of aluminum when subject to heat (that is, the temperature range below and up to the melting temperature in which aluminum can be readily forged or deformed while still in a solid state) is very narrow (in contrast to steel which has a fairly large temperature range defining the plastic zone). Control over the amount of heat supplied to thin aluminum sheet is thus precisely and accurately required in order to achieve sufficient heating to place and maintain the aluminum in a plastic condition, yet avoid unacceptable and undesired melting thereof. Thirdly, a further and significant problem experienced with attempts to weld thin aluminum sheets is the difficulty created by the oxide coating which inherently develops and coats the exterior surfaces of aluminum sheet upon manufacture thereof. The oxide coating on the exposed surfaces of aluminum sheet has a very high melting point, such as in the neighborhood of about 3,600° F. If one attempts to first melt the oxide coating on a thin aluminum sheet, the high temperature required to do so is so high as to cause almost immediate melting of the thin underlying aluminum sheet and hence this effects spattering of liquid aluminum and effectively destroys the sheet in the area of the proposed weld. Lastly, the lower strength of aluminum (in contrast to steel) is believed to be such as to cause too rapid a collapse of a projection during projection welding, which rapid collapse prevents proper follow-up of the electrode, and hence prevents creation of a proper projection weld.

At the present time, welding of overlapping thin aluminum sheets is primarily carried out by spot welding, that is, a spot weld is created between two overlapping thin aluminum sheets which directly contact one another. This process is primarily utilized only in those industries where the precision and complexity associated with such process, and the significant cost thereof, is required. For example, spot welding of thin aluminum sheets is conventionally utilized in the manufacture of aircraft. Such spot welding process, however, requires that the aluminum surfaces be initially cleaned and treated to eliminate the surface oxide coating, which treating processes are complex and time consuming, and the spot welding operation must be carried out almost immediately thereafter to prevent reformation of oxide coating in the cleaned areas. In situations where the sheet aluminum is intended for spot welding, it is also conventional to apply a coating on the aluminum sheet at the forming mill, which coating minimizes the development of surface oxidation on the aluminum sheet, although this mill-applied coating must also be removed prior to use and spot welding of the aluminum sheets. Because of the extensive and necessary cleaning steps associated with spot welding of aluminum sheets, and the complications associated with the temperature properties thereof, spot welding of aluminum sheets is complex and costly, and often unreliable, and thus such process has been commercially adopted only where the product requirements do not permit substitution of more economical materials or processes.

Even in the aircraft industry, welding of thin aluminum sheets is primarily carried out by spot welding, and projection welding is not believed feasible or utilized, and in fact projection welding of aluminum sheets, as a general principle, has been generally considered not practically possible.

Another problem associated with spot welding of aluminum is that such technique typically requires significantly high amperage, such as up to about 40,000 amps, be applied to the overlapping sheets between the opposed electrodes, and such amperage is typically applied over a significant time period, such as up to seven full amperage cycles. For example, the spot welding of aluminum sheets is typically carried out by a process known as mid-frequency spot welding, the latter requiring a rather complex and expensive system. In this process the line current utilized is typically three-phase 440 volt AC, which is then converted to DC, and is then formed into a square wave current of high frequency or hertz, typically in the range of 800 to 1,500 hertz. This is then supplied through a controller to a transformer and is again rectified to DC and then supplied to the welding gun. Such mid-frequency welding arrangement, however, is very costly and also raises safety concerns inasmuch as very high voltage DC is supplied at a small transformer which is connected to and positioned close to the welding gun. Further, due to the high current intensity necessary to transfer the current from the curved contact faces of the electrodes into and through the contacting aluminum sheets, the tips of the electrodes tend to pick up a significant quantity of aluminum from the sheets during the welding thereof, and this significantly contaminates the electrode tips and accordingly greatly reduces the life thereof.

In other industries and specifically the automotive industry, overlapping steel sheets are often spot welded, and in recent years there has been an increased commercial acceptance and use of projection welding, as mentioned above. While there is a desire in the automobile industry to use increasing amounts of thin aluminum sheets so as to reduce vehicle weight, and while there has been attempts to utilize spot welding of thin aluminum sheets for automobile bodies, to the best of Assignee's knowledge such prior attempts have achieved only limited commercial acceptable since the requirements associated with the cleaning and treating of the sheets to effect removal of surface oxide prior to welding present sufficient manufacturing problems and costs as to make such spot-welding aluminum process generally unacceptable where mass production of products under economical cost procedures is required. At the present time, while there is a desire to utilize a greater amount of aluminum in the construction of automobiles, the joining of aluminum sheets continues to be a significant problem, and thus most aluminum sheets are currently joined either by mechanical fasteners such as rivets, or where welding is required, by mid-frequency spot welding.

While spot welding of overlapping aluminum sheets can be and is successfully performed, although normally only under complex and controlled processes as explained above, the welding of overlapping aluminum sheets by projecting welding, prior to the present invention, has generally been considered impractical due to the narrow plastic range of aluminum, the requirement of projection collapse during projection welding, and the many other complications which exists when attempting to weld aluminum sheets, such as explained above with respect to spot welding.

Accordingly, it is an object of this invention to provide an improved projection welding process and apparatus which is particularly desirable for permitting projection welding of nonferrous sheets, particularly thin aluminum sheets.

In the improved projection welding process and apparatus of this invention, one of the overlapping nonferrous (i.e. aluminum) sheets is provided with a projection formed therein, and the sheets are positioned so that the tip of the projection on one sheet contacts the surface of the other sheet. The sheets are not subjected to surface pretreatment, and the sheets typically have conventional surface oxide thereon when presented for projection welding. A projection welding head assembly, preferably the assembly of the aforementioned Ser. No. 08/734,484 application, is positioned with the electrode thereof engaged with one of the sheets, and the other sheet is typically positioned against a stationary backup or electrode. The electrode of the welding head then imposes, in rapid time succession, a series of welding pulses to the overlapping contacting sheets. The series of welding pulses includes two and preferably at least three pulses which progressively step up in amperage to provide for precise control of the heating of the projection and the associated contact area on the other sheet to cause heating to the plastic state, and then controlled forging (i.e. collapsing) of the projection occurs with subsequent and progressive creation of the desired weld nugget.

In a preferred embodiment of the improved process and apparatus, the series of weld pulses also preferably includes, at the end of the step-up pulses, one or two pulses which progressively step down in current magnitude so as to permit greater control over the plasticity of the projection and the forging together of the overlapping sheets to create the desired weld bead. With this arrangement, the contact pressure between the tip of the projection and the opposed sheet, and the step up in the electrical current transmitted therethrough, is believed sufficient to cause an initial breakdown of the oxide coatings at the contact zone without melting the underlying aluminum while enabling the initial creation of a small weld nugget at the contact zone. The progressive buildup of the current pulses then allows the current to pass around the edge of the nugget to permit the nugget to progressively enlarge. The current step-down pulses at the end of the cycle are provided to counteract the rapid cooling properties of aluminum, and hence this additional lower stage heating maintains the aluminum in the nugget area sufficiently heated to permit additional forging together of the two sheets due to the pressure applied thereto by the moving electrode.

In the improved projection welding process of this invention, as aforesaid, the electrode preferably initially imposes a squeezing or clamping force on the overlapping sheets which preferably causes a partial collapse of the projection, such as at the tip end thereof, to effect breaking of the surface oxide layer. Thereafter initiation of the series of welding pulses permits progressive heating and plasticizing of the projection and the progressive collapsing thereof and the progressive formation of a weld bead between the overlapping sheets.

The improved projection welding process and apparatus of the present invention has so far proven to provide unexpected results in that it has been at least experimentally proven capable of permitting projection welding of overlapping aluminum sheets without requiring pretreatment of the sheets to remove surface oxides, which such process has previously generally been considered impractical.

Other objects and purposes of the invention will be apparent to persons familiar with projection welding, and specifically the properties of aluminum, upon reading the following specification and inspecting the accompanying drawings.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

The improved projection welding process and apparatus of this invention, particularly for use with nonferrous materials such as thin aluminum sheets, will be described with reference to FIGS. 6–9.

Figure 6:
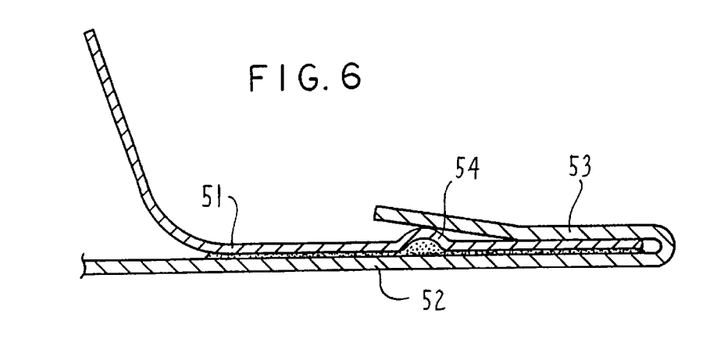
FIG. 6 is an enlarged fragmentary view similar to FIG. 2 but illustrating overlapping aluminum sheets having a preferred configuration of projection formed thereon.

To create a projection weld between thin overlapping nonferrous sheets, and more specifically aluminum sheet, there is provided a pair of thin aluminum sheets 51 and 52 (FIG. 6) which in the illustrated embodiment are shaped to create a hem-type projection weld so that one of the sheets 52 has a projecting part 53 which overlaps and is movable into engagement with the tip or projecting end of a projection 54 which is preformed in the other sheet 51. For projection welding of aluminum sheet metal, the projection 54 is preferably formed of a conventional dome configuration (rather than the more truncated conical configuration preferred for sheet steel) which, as illustrated by FIG. 6, is formed similar to but generally of a height (or depth) such that the projection approximately corresponds to but is slightly less than a half spherical shell. The curvature of the inner wall of the domed projection is such that it is formed approximately on a radius, the magnitude of which is several times greater than the thickness of the aluminum sheet metal.

Figure 9:
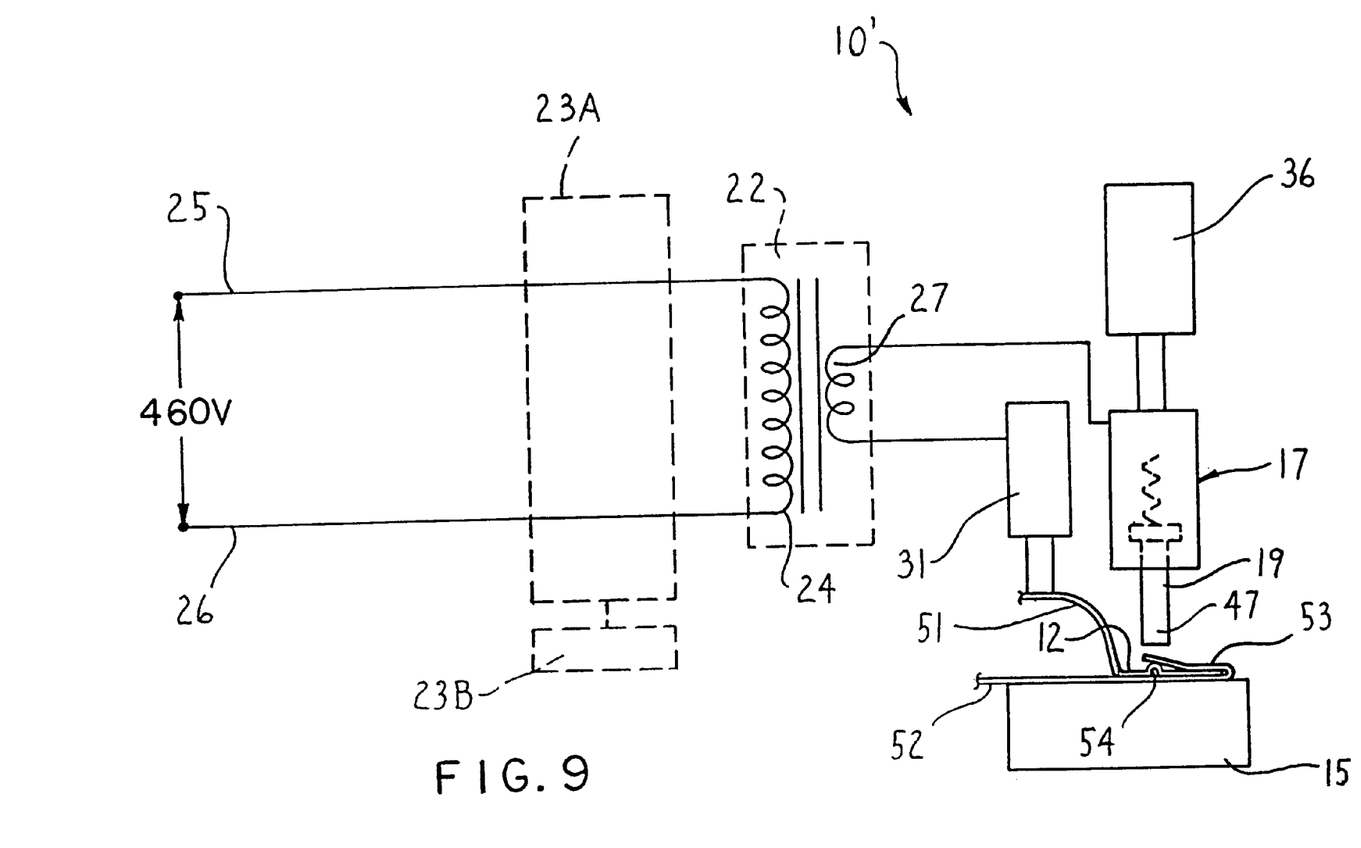
FIG. 9 diagrammatically illustrates the projection welding arrangement of this invention when used to carry out the improved welding process.

To carry out projection welding between the aluminum sheets 51 and 53 as illustrated in FIG. 6, the sheets are disposed within the welding arrangement 10' illustrated in FIG. 9, which welding arrangement 10' substantially corresponds both structurally and functionally to the arrangement 10 of FIG. 1 and hence corresponding reference numerals have been utilized to identify the corresponding parts thereof. In the improved welding arrangement 10' of this invention, however, to permit creation of a projection weld between the thin aluminum sheets 51 and 53, one of the sheets is provided with the dome-type projection 54 thereon, and in addition the welding arrangement is provided with a controller 23A which permits selecting (i.e., programming) of the length of time, and hence the quantity of electrical current, transmitted therethrough and applied to the electrode 47 during each of a plurality of sequential half-current wave forms, as explained hereinafter.

In addition, the weld head assembly 17 of FIG. 9 permits the electrode 47, when moved toward the backup support 15 to effect engagement of the aluminum sheets therebetween, to be subjected to an initial contact or squeeze force which is transmitted through the stacked aluminum sheets prior to actual application of electrical current to and through the projection welding zone.

The performance of a projection welding operation on overlapping aluminum or nonferrous sheets, in accordance with the present invention, is carried out by supplying to the electrode, for transmission to and through the welding zone of the overlapping sheets, a welding current which employs a plurality of sequential electrical current pulses which preferably include at least a first series of pulses which are of progressively increasing current magnitude or intensity to provide for a progressive supply of current and heat into and through the welding zone, which in turn permits the heating of the welding zone sufficiently to maintain the welding zone temperature within the critical but narrow plastic temperature range of aluminum, with the progressive buildup of the heat energy causing a progressive heating throughout the welding zone to accordingly cause a progressive or slow collapse of the projection to permit creation of a proper weld bead between the overlapping aluminum sheets. This series of electrical current pulses also preferably includes a second plurality of pulses which follow the first plurality and which effectively ramp or step down in current intensity to thus provide sufficient additional heat to ensure proper collapse and proper creation of the desired weld bead between the overlapping aluminum sheets, while at the same time preventing the supply of excessive heat which might otherwise destroy the bead by effecting undesired melting of either the bead or the surrounding parent material.

Figure 7:
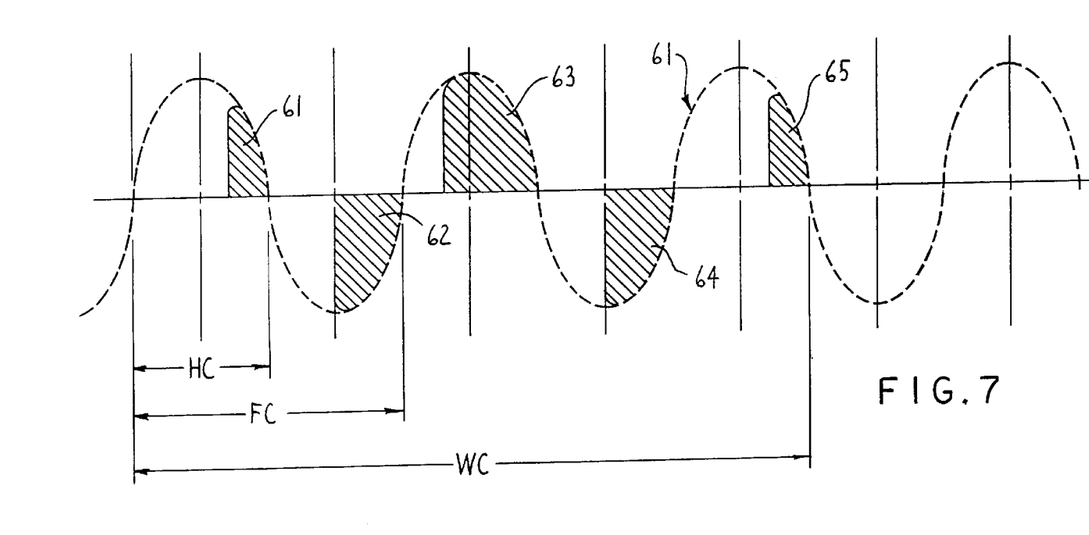
FIG. 7 diagrammatically illustrates the sequential current pulse arrangement associated with a single projection welding cycle according to the present invention.

As illustrated in FIG. 7, the power as supplied to the controller 23A by the conductors 25, 26 is conventional single phase 460 volt 60 hertz AC which is basically sinusoidal in form, as is well known, as indicated at 59 in FIG. 7. The current supply thus has a cycle which has a length designated FC in FIG. 7, this being a full cycle of supply current, the latter of course being broken down into half cycles HC which are of opposite polarity. In the present invention, the controller 23A has software associated therewith which, in conjunction with a conventional programming panel 23B, enables each half wave HC of each full current cycle FC to be individually controlled with respect to the switching on and off thereof, as well as controlling the time duration of the "on" cycle, to thus permit control over the current pulse which is supplied to the welding electrode 47. In the present invention, the actual individual welding cycle, designated WC in FIG. 7, is of sufficient duration to include more than one current cycle FC, and hence enables the controller to sequentially provide a plurality of electrical current pulses for performing a single projection welding operation. The preferred arrangement illustrated by FIG. 7 depicts five such pulses designated 61, 62, 63, 64 and 65 for defining a single projection welding cycle WC. In the arrangement of FIG. 7 the plurality of pulses 61–65 defining a single projection welding cycle WC are defined by sequential current half waves HC, and thus the series of pulses 61–65 are of sequential alternating polarity consistent with the current wave form.

In addition, the series of pulses 61–65 defining the projection welding cycle WC preferably includes a plurality of pulses which progressively increase in electrode current intensity, that is, the pulses 61, 62 and 63 in FIG. 7 are upwardly stepped in that the first pulse 61 is triggered during its respective half cycle HC such that the current intensity is only a fraction of the half wave HC current intensity, and the next succeeding pulse 62 of opposite polarity is triggered at a somewhat earlier point in time in the half wave so that the current intensity of this pulse 62, while less than the half wave current intensity, is greater than the current intensity of the preceding pulse 61. In the next half wave HC, the triggering of the pulse 63 is even still further advanced within the half wave so that the current intensity of the pulse 63 is greater than the current intensity of the preceding pulse 62. In the illustrated embodiment, the pulses 61, 62 and 63 are intended to represent current intensities of about 20%, 50% and 80%, respectively, of the half wave HC current intensity.

The pulse sequence 61–65 also preferably includes a second plurality or series of pulses which follow the initial step-up series of pulses 61–63. This second series of pulses, which starts at the pulse 63 and continues through the pulse 65, creates a progressive decrease or step down in the current intensity of each succeeding pulse, with the pulse 65 representing the last or terminal pulse of the projection weld cycle WC. After triggering of the maximum intensity pulse 63, the next pulse 64 is of lesser current intensity, and for this purpose the timing of the firing of the pulse 64 is again further delayed into the half cycle wave form so that the pulse 64 has less energy than the preceding pulse 63. Similarly, the next pulse 65 has its firing point delayed even further into its half wave so that the energy of the pulse 65 is thus stepped down and is accordingly less than the current intensity of the preceding pulse 64. Thus, just as the three pulses 61–63 in effect define an upwardly stepped or ramplike sequential increase in electrical intensity applied to the electrode, the three pulses 63–65 define a reverse ramp, namely a progressive step down in electrical intensity between the sequentially adjacent pulses, until the projection weld cycle WC is completed. In the arrangement illustrated by FIG. 7, the pulse 64 represents a current intensity of about 50% (similar to the pulse 62), and the succeeding pulse 65 represents a current intensity of about 20% (similar to the pulse 61). The overall pulse sequence associated with the cycle WC, in this illustration, thus includes first and second series of pulses which sequentially follow one another, with the first series being of a progressively upwardly stepped current intensity, and the pulses of the second series being a progressively downwardly stepped current intensity, with the last or maximum intensity pulse of the first series also functioning as the first or maximum current intensity pulse of the second series.

While experimental evaluation has indicated that the 20/50/80/50/20 pulse sequence as diagrammatically illustrated in FIG. 7 has proven desirable for successful projection welding of sheet aluminum, it will be appreciated that other pulse sequences and progressions can also be utilized. For example, experimental testing has indicated that a pulse current intensity of 40/60/80/60/40 also produces acceptable projection welding of aluminum sheets. It is believed that the step up or ramp up sequence of pulses is particularly important for successful projection welding. While the ramp down pulse sequence is also believed to improve the projection welding process, nevertheless the ramp down pulse sequence is not believed to be as essential as is the ramp up pulse sequence.

Figure 8:
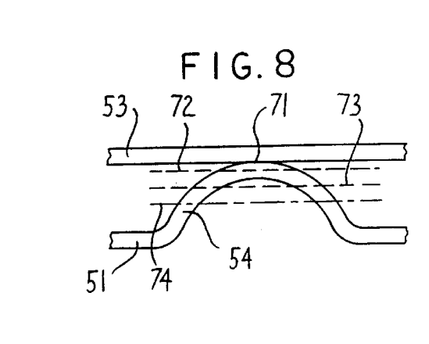
FIG. 8 is a fragmentary enlarged view which illustrates the welding zone between overlapping sheets, and the progressive collapse of the projection during a projection welding cycle.

When a projection weld is to be created between overlapping aluminum sheets, such as in the arrangement depicted by FIG. 9, the electrode 47 is advanced into contact with the adjacent sheet 53 until the overlapping sheet 53 contacts the projection 54, and the aluminum sheets are effectively held in force engaged relation between the electrode 47 and the support plate 15. In this initial force engaged relation, the top aluminum sheet 53 effectively contacts the outermost extremity or tip 71 of the projection 54 as indicated in FIG. 8. At such time, the actual contact between the projection 54 and sheet 53 is substantially a point contact, and this contact in terms of current transmission is further disrupted by the fact that the surfaces of the aluminum sheets are covered with surface oxide inasmuch as the process of this invention is intended to be carried out on aluminum sheets which do not require pretreating or precleaning of the surfaces. If electric welding current is transmitted to the weld zone in the position substantially as illustrated by solid lines in FIG. 8, then the high electrical resistance which exists due to the surface oxide at the contact point would in all probability prevent successful transmission of low electric current therethrough, but instead would require application of a high electrical current which, upon breaching the oxide layer due to the high temperature required, would in all probability cause immediate melting of the underlying low-melting temperature aluminum, effectively causing a mini-explosion of molten aluminum.

Accordingly, in the process and apparatus of this invention, and prior to application of the initial weld pulse 61, the weld zone (i.e., the sheet 53 and its contact with the projection 54) is effectively subjected to a clamping or holding force of rather high magnitude, which holding force is imposed by the electrode 47 against the sheet 53 and transmitted through the weld zone (i.e. through the projection 54) to the backup support 15. This predetermined and generally predefined clamping force as imposed on the weld zone by the electrode is of a magnitude which is greater than that typically employed when projection welding sheet steel, and is preferably in the magnitude of at least about 350 to 400 pounds. The use of this higher magnitude clamping force and its imposition on the weld zone, prior to initiation of the projection welding current pulses, is believed to cause at least a very small or limited amount of deformation or collapse of the projection 54 inasmuch as aluminum possesses lesser strength than steel. This predetermined clamping force is thus believed to effect a slight but only partial collapse of the projection 54, such as a partial flattening of the tip or top of the projection, such partial flattening being diagrammatically indicated by the dash-dot line 72 in FIG. 8. Of course, due to the spring biasing of the electrode 47, the electrode rapidly follows up any such partial collapse of the projection and maintains contact therewith. This partial collapse, however, in addition to creating a larger surface area on the projection 54 for contact with the opposed generally flat surface of sheet 53, also causes a bending of the projection surface, particularly at the exterior annulus defined generally within the plane of the line 72. This bending is believed to break the oxide surface coating and provides for direct transmission of electrical current into the underlying parent aluminum material when the projection welding cycle is initiated.

After the projection 54 has been subjected to the predetermined precompression as explained above, then the pulsed welding cycle WC is initiated, and the plurality of pulses, such as pulses 61–65, are sequentially applied to the weld zone, with the timing and magnitude of these pulses being controlled by the predetermined setting of the controller 23A. The first pulse 61 is of low current intensity or energy level, and is transmitted through the small contact area which exists between the projection 54 and the sheet 53, and particularly into the parent aluminum inasmuch as breaks in the oxide surface layer have presumably been created due to the initial partial collapse of the dome. This energy from the initial pulse 61 is supplied to a very small area, such as the area represented by the annulus at the top of the dome in plane 72 in FIG. 8, and the low current or heat level in conjunction with the small area or volume of the aluminum exposed thereto results in creation of a small weld nugget between the dome 54 and the sheet 53.

Following termination of the first pulse 61, then the second pulse 62 of greater current intensity or energy is applied and, since a nugget has already been initiated by the first pulse 61, the energy from the pulse 62 now radiates radially outwardly of this nugget for acting on a greater area and volume of aluminum, and hence causes the nugget to progressively increase in diameter. During each of these pulses 61 and 62, the progressive heating of the aluminum into the plastic zone results in a partial collapse of the projection due to the pressure of the electrode, such as to the levels 73 and 74 as diagrammatically depicted in FIG. 8, during which collapse the spring-urged electrode 47 continues to follow-up and maintain proper contact with the sheet 53 and projection 54.

After completion of the second pulse 62, then the controller thereafter supplies the third pulse 63 to the electrode and into the weld zone. This pulse 63 is of even greater electrical energy, and due to the preformed weld nugget, the electrical energy continues to radiate radially outwardly into a greater area and hence greater volume of aluminum due to the progressive buildup in the size of the nugget by the prior two pulses. This results in additional material in the projection 54, particularly that material at a greater radius, being heated into the plastic zone so that the pressure of the electrode causes additional collapsing of the projection to further increase the size (i.e. diameter) of the weld bead being created between the sheets 51 and 53.

The remaining pulses 64 and 65 result in additional sequential supplying of electrical current and hence electrical energy into and through the collapsed projection 54, and are believed to result in the subsequent supplying of sufficient additional heat as to maintain the at least partially collapsed projection 54 in the plastic zone so that, with the continued application of the electrode pressure to the weld zone, a more complete formation (i.e. forging) of the weld bead and a secure attachment between the sheets 51 and 53 is achieved.

With the progression of weld pulses as summarized herein, a much greater control over the electrical energy supplied to the weld zone can be achieved, and at the same time the vary narrow but low temperature plastic range of aluminum can be reached and maintained over a longer period of time so as to permit sufficient heat to be progressively supplied thereto whereby a proper weld bead can be developed and created between the overlapping sheets. The overall projection welding cycle, in the embodiment described above and as illustrated in FIG. 7, occurs over more than one current cycle FC, and in fact occurs over between two and three weld cycles, and more specifically occurs during five weld half cycles HC in the illustrated embodiment.

While the invention as described above and as experimentally evaluated has related primarily to projection welding of thin aluminum sheets, such as sheets having a thickness in the range of from about 0.020 inch to about 0.050 inch, it is believed that this process or similar variations thereof will be equally applicable for other nonferrous metal sheets and specifically those nonferrous materials which have a relatively low melting temperature and a relatively small plastic temperature range.

Summarizing the process and apparatus of this invention, the thin aluminum sheets are formed so as to have a suitable projection 54 associated with one of the sheets, and the overlapping sheets are disposed for cooperation with a welding head, substantially as illustrated in FIG. 9. The sheets are not subjected to pretreatment or surface cleaning designed specifically for removal of the conventional surface oxide, and hence the sheets when submitted to the projection welding process have surface oxide thereon.

After positioning the overlapping sheets adjacent the electrode so that the projection 54 is substantially aligned with the electrode, the electrode 47 is advanced to effect clamping of the weld sheets between the electrode 47 and the opposed backing support 15. The electrode imposes on the weld zone, namely on the projection 54, a clamping force of sufficiently high magnitude as to cause a limited partial collapse of the projection 54. With the electrode continually spring urged into contact with the upper aluminum sheet, the control 23A then activates the projection welding cycle WC so that a plurality of weld pulses, such as pulses 61–65, are then sequentially supplied to the electrode 47 for application to the weld zone of the overlapping sheets. The first low energy weld pulse 61 is transmitted into the aluminum material through the breaks created in the oxide layer by the preliminary partial collapse thereof and causes a small weld nugget to start to build up. The subsequent pulse 62 supplies a higher level of electrical current or energy to the weld zone and, due to the higher resistance of the preformed weld nugget, the weld current is transmitted around the peripheral edge of the nugget and consequently causes a greater buildup in the weld nugget size. In similar fashion the subsequent weld pulse 63 supplies still even greater energy which again flows generally around the outer periphery of the weld nugget and causes still a further enlargement thereof. Throughout this sequence, the electrode 47 continues to apply a clamping force onto the weld zone and, due to the progressive heating of the projection into the plastic temperature range, the electrode progressively causes the projection 54 to collapse and effects forging of the collapsed projection 54 to the overlying aluminum sheet 53. The subsequent weld pulses 64 and 65, of reduced electrical current, allow additional heat to be supplied to the projection and specifically the forging zone so as to counteract the tendency of the aluminum to rapidly cool. This additional heat thus maintains the projection in the plastic temperature range for a lower period of time to facilitate additional forging of the two sheets together due to the force supplied thereto by the electrode.

The exact number of pulses utilized in the overall weld cycle WC, as well as the number of pulses used during both the step up and step down phase, and the magnitude of the weld current differential between the adjacent pulses, will typically be determined based upon the specific physical parameters of the projection weld being created, which parameters such as projection shape and size, and aluminum sheet thickness, will influence and provide control over the weld cycle and the individual pulses associated therewith. Such parameters will also influence and have a factor in determining the magnitude of the initial clamping force imposed on the weld zone by the electrode, although such clamping force will typically be of magnitude greater than that utilized when performing a projection welding operation on compatible steel sheets.

In carrying out the process of this invention, standard 460 volt 60 hertz electrical energy is supplied to the primary of the transformer through the controller 23A which is capable of outputting therefrom, for supply to the transformer, solely the plurality of sequential current pulses, such as pulses 61–65, as individually created and derived from sequential half wave forms of the supplied standard electrical power. The controller 23A, through its appropriate internal software and the settings achieved through the programmer 23B, can adjust the trigger or firing point for each half wave form of the supplied current cycle, and can permit selection of the number of half cycles to be utilized in defining the projection welding cycle, whereby the number and sequence of the current pulses as well as the magnitude thereof can be selected and controlled, with these current pulses then being supplied through the transformer for ultimate supply to the electrode. The individual current pulses, at least as a maximum value, are typically of greater amperage than is typical utilized in resistance welding, and the current pulses are typically of short duration, such as in the range of from about 3 to about 14 milliseconds, and the time interval between adjacent pulses is normally within this same range.

In situations where the projection welding cycle WP includes an odd number of pulses, then the controller 23A includes appropriate memory and switching controls to ensure that the initial pulses of sequential projection welding cycles are of opposite polarity to minimize residual flux buildup in the transformer. Conversely, if the projection welding cycle WC employs an even number of pulses, then in such case the controller through its memory will ensure that the initial pulse of each welding cycle is of the same polarity.

The controller is a conventional multi-purpose single-phase controller for welding equipment as manufactured and sold by Medar, such as a Medar Model Medweld 500S controller.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A resistance welding process for projection welding of two sheets, comprising the steps of:
   providing first and second thin aluminum sheets with one of said sheets having a hollow beadlike protection formed therein and projecting transversely thereof;

providing a welding head assembly which reciprocally supports thereon an electrode having a flat tip which is disposed in generally opposed relation to a support;

positioning said first and second sheets adjacent one another and generally between the tip of said electrode and said support so that a tip of the projection on said one sheet contacts an opposed side face on the other sheet with the projection being substantially aligned with the electrode;

engaging the tip of the electrode with the first sheet adjacent and substantially in alignment with the projection and applying a pressing force from said electrode onto said first sheet with said pressing force being transmitted through said projection for holding said first and second sheets between said electrode and said support;

applying a pressing force from said electrode onto the overlapping first and second sheets of sufficient magnitude to cause a partial collapse of the tip of the projection so as to break an oxide surface coating the tip of the projection;

thereafter supplying a predetermined series of individual, spaced unipolar welding current pulses of different current magnitude to said electrode for transmission into said first and second sheets where they contact at said partially collapsed projection to create a weld nugget between the sheets; and continually pressing said electrode against said first sheet throughout said series of pulses to effect forging of said first and second sheets together at said weld nugget.

2. A process according to claim 1, wherein said series of welding pulses includes applying a first said pulse of a first maximum current to said electrode and thereafter applying to said electrode a second said pulse of a second maximum current which is greater than said first maximum current and thereafter applying to said electrode a third said pulse of a third maximum current which is greater than said second current.

3. A process according to claim 2, wherein the series of pulses includes applying to said electrode a fourth said pulse having a fourth maximum current which is less than said third maximum current and which is applied to said electrode after said third pulse.

4. A process according to claim 3, wherein the series of pulses includes applying to said electrode a fifth said pulse which has a fifth maximum current which is less than said fourth maximum current and which is applied to said electrode after said fourth pulse.

5. A process according to claim 1, wherein said series of pulses includes an initial series of pulses which are sequentially of increasing electrical current.

6. A process according to claim 5, wherein said series of pulses include a subsequent series of pulses which are sequentially of decreasing electrical current.

7. A process according to claim 1, wherein said series of pulses includes at least initial, intermediate and final pulses which are sequentially applied to said electrode in timed sequence and wherein said intermediate pulse is of greater current magnitude than said initial and final pulses.

8. A process according to claim 1, wherein each of the pulses of said series occurs over a time interval which is less than the time of an electrical current half wave form of standard alternating current electrical energy used to create said pulses, each of the pulses has a magnitude less than or equal to a maximum magnitude of the electrical current half wave form, and wherein at least some of said pulses are defined over different time intervals.

9. A process according to claim 1, wherein the step of engaging the tip of the electrode with the first sheet includes contacting the flat tip of the electrode onto the portion of the projection free first sheet that is in alignment with the projection on the second sheet and applying pressure so as to break the oxide layer covering said projection.

10. A process according to claim 9, wherein the step of engaging the tip of the electrode with the first sheet includes wrapping a hem portion of the first sheet around at least part of the second sheet, positioning the projection on the second sheet so that it contacts the nonhem portion of the first sheet, and contacting the flat tip of the electrode onto the hem portion of the first sheet, thereafter mechanically partially collapsing the projection against the nonhem portion of the first sheet.

11. A resistance welding process for projection welding of two thin aluminum sheets, comprising the steps of:

providing first and second thin aluminum sheets with one of said sheets having a hollow domelike projection formed therein and projecting transversely thereof;

providing a welding head assembly which reciprocally supports thereon an electrode having a tip which is disposed in generally opposed relation to a support;

positioning said first and second aluminum sheets adjacent one another and generally between the tip of said electrode and said support so that a tip of the projection on said one sheet contacts an opposed side face on the other sheet;

engaging the tip of the electrode with the first sheet adjacent and substantially in alignment with the projection so that the first and second sheets are engaged between the tip of the electrode and the support to maintain the tip of the projection engaged with the opposed side face of the other sheet;

applying a pressing force from said electrode onto said first sheet substantially in alignment with the projection to cause a partial but limited collapse of the projection adjacent the tip thereof while maintaining the projection in contact with the opposed face of said other sheet so as to break an oxide layer between the projection and opposed face of said other sheet;

thereafter supplying a predetermined series of individual unipolar welding current pulses to said electrode for transmission into said first and second sheets where they contact at said projection to create a weld nugget between the sheets; and continually pressing said electrode against said first sheet throughout said series of pulses to effect forging of said first and second sheets together at said weld nugget.

12. A process according to claim 11, wherein said series of welding current pulses includes at least first and second pulses of different maximum electrical current.

13. A process according to claim 12, wherein said series of welding current pulses includes at least three pulses which are sequentially spaced during the projection welding process and which are of progressively increasing maximum electrical current.

14. A process according to claim 12, wherein the series of welding current pulses includes at least three pulses which are sequentially spaced during the projection welding process and which are of progressively decreasing maximum electrical current.

15. A process according to claim 12, wherein said series of welding pulses includes at least initial, intermediate and final pulses which are sequentially applied to said electrode in timed and spaced sequence, and wherein said intermediate pulse is of greater current magnitude than at least one of said initial and final pulses.

16. A process according to claim 15, wherein said intermediate pulse is of greater current magnitude than either of said initial and final pulses.

17. A process according to claim 11, wherein each pulse is generated from a half wave of a 60 cycle per second wave form.

* * * * *